United States Patent [19]

Berry, Jr. et al.

[11] 3,715,379

[45] Feb. 6, 1973

[54] PROCESS FOR THE MANUFACTURE OF ORTHOCHLOROBENZAL-MALONONITRILE

[75] Inventors: Walter L. Berry, Jr., Yardley, Pa.; Dan P. Nisonger; Preston S. Craig, both of St. Simons Island, Ga.

[73] Assignee: Thiokol Chemical Corporation, Bristol, Pa.

[22] Filed: Feb. 3, 1970

[21] Appl. No.: 8,388

Related U.S. Application Data

[63] Continuation-in-part of Ser. No. 691,192, Dec. 18, 1967, abandoned.

[52] U.S. Cl. ............................. 260/465 G, 424/304
[51] Int. Cl. ............................................ C07c 121/70

[58] Field of Search ..................... 260/465 G, 465 H

[56] References Cited

UNITED STATES PATENTS 3,549,683  12/1970  Rosin ................................ 260/465

Primary Examiner—Lewis Gotts
Assistant Examiner—Dolph H. Torrence
Attorney—Thomas W. Brennan

[57] ABSTRACT

A process for preparing orthochlorobenzalmalononitrile, useful as a chemical riot control agent, directly from the solventless reaction of neat orthochlorobenzaldehyde and malononitrile, in the presence of an organic or inorganic catalyst.

6 Claims, No Drawings

PROCESS FOR THE MANUFACTURE OF ORTHOCHLOROBENZALMALONONITRILE

This application is a continuation-in-part of application Ser. No. 691,192, filed Dec. 18, 1967, now abandoned.

This invention relates to the production of malononitriles; more particularly it relates to a process for preparing the compound, orthochlorobenzalmalononitrile, by reacting neat orthochlorobenzaldehyde and malononitrile in the presence of a catalyst, which catalyst may also be considered as a reaction initiator and which also performs as a ph adjuster.

The compound above mentioned, with which this invention is concerned, and compounds of like chemical characteristics, though difficult to handle because of their noxious, irritating quality when in contact with human skin, nasal and ocular membranes and tissues, have found increased favor over other materials, such as "tear gas", as a chemical riot control agent. The particular compound, orthochlorobenzalmalononitrile, as stated above, is highly useful in riot and unruly crowd control, because, in spite of its potency, it is relatively safe to use. The material is a white, crystalline powder of talcum powder fineness and appearance. When used as above indicated, it may be dispersed as an aerosol cloud of finely divided particles or in smoke clouds produced by burning type grenades where it is combined with a fuel or oxidizer.

In the prior art methods of making this compound the reactants are brought into contact with each other in one or more solvent media such as water, alcohol (methanol or ethanol) other organic solvents or combinations thereof. The disadvantage of this manner of making the compounds is that many more drying steps, or longer drying periods, must be included in the process and thereafter a pulverizing or comminuting step to reduce the dried product to a form suitable for the intended use is required. It would therefore be most advantageous to obtain the product, or at least a substantial portion thereof in powdered form without the above mentioned drying and/or pulverizing step. In addition, by reducing the number of steps involved in preparing a suitable end product, the chances of contact thereof with the skin, eyes, oral passages and the like of the production workers and manufacturing technicians are reduced. A still further advantage is that for a given quantity of product, smaller volume reacting apparatus is required.

Accordingly, it is an object of this invention to provide a process for preparing a riot control agent in powdered form directly from the reaction, in a suitable vessel, of neat liquid orthochlorobenzaldehyde and malononitrile, in the presence of an organic or inorganic catalyst wherein no drying step or stage is required to obtain the desired end product.

It is another object of this invention to prepare a riot control agent, orthochlorobenzalmalononitrile, from the reaction in a reaction vessel of liquid orthochlorobenzaldehyde (above 70°F.) and liquid malononitrile (above 110°F.) and the addition, while mixing of the basic materials, of small quantities of an organic catalyst such as piperidine, triethynolamine, diethylamine and/or triethylamine.

Still another object is to obtain a product of the character described wherein the catalyst is an inorganic material such as sodium hydroxide, ammonium hydroxide or ammonia, gaseous or liquid.

Other objects and advantages will no doubt occur to a skilled artisan from the description and illustrative examples which follow, it being understood that said description and examples are illustrative only and not limitative. Parts set forth are by weight unless otherwise stated.

In carrying out the objects of the herein described invention it has been found that the process reaction can be run quantitatively by direct admixture in batch quantities of the neat, liquid reactants and mixing the same while metering in, or otherwise administering small quantities of the catalyst. Since the reaction is exothermic no external heat addition is necessary, although it is desirable to preheat the reaction vessel to some extent. It has been found that best results are obtained when the reaction temperature is controlled within the range of 110° – 150° F. and preferably within the range of 110° – 135° F. Reaction temperature control is most practically, at present, achieved by means of a cooling fluid circulated around the reaction vessel. Suitable jacketed vessels are readily available and have been used quite successfully in carrying out the process of the invention. In other instances control has been achieved by direct addition to the reactants of a cold material such as dry ice. Other materials are also effective, in fact certain cryogenic compounds such as ammonia can not only be useful as reaction temperature controllers but also can be effective to catalyze or initiate the reaction itself as will be indicated more fully hereinafter.

The product of this invention when used as a riot control agent is dispersed over and about a preselected target area in an aerosol cloud of finely divided particles by well known means. Dispersal is also accomplished by blowers, bursting grenades and bombs, or by burning a mixture of the powder and a fuel. Hardware of suitable form has long been available and is deemed to require no further description here.

The effects of the compound produced by the process of the invention are well known to the art. It has wide spread use and its effects are immediate, even in low concentrations. Incapacitation in man is produced usually 20 to 60 seconds after exposure and lasts for 5 to 10 minutes after removal of the afflicted person to fresh air, after which recovery is complete with no after effects. During this period of exposure affected persons are rendered incapable of concerted action, as the agent causes severe burning sensation in the eyes with copious tears, coughing and difficulty in breathing. The eyes close involuntarily, the nose runs and the skin, especially when moist, stings.

The dosages effective to cause the above discomfort for the average person are on the order of 10 to 20 milligrams per cubic meter. In wide spread tests and in actual practice, no known harmful after effects have been recorded. It has been found that larger dosages can be absorbed and the likelihood of a lethal dose occurring in field use is indicated by the calculation of such a dose, based on extensive animal tests, to be on the order of 15,000 times the dosage above stated.

The process of this invention is represented by the following formula:

$$C_6H_4CHOCL + CH_2(CN)_2 \rightarrow C_6H_4CLCH=C(CN)_2 + H_2O$$

wherein the water produced during the reaction is driven off by the heat thereof. Continued heating under vacuum after completion of the reaction is generally desirable to insure complete water removal.

Since the reaction as indicated above is exothermic, the water produced is driven off and a white, dry powdery product obtained which analyses to be about 97% orthochlorobenzalmalononitrile, portions or all of which can be used as is without further separation, depending upon the method selected for dispersal. It is seen, therefore, that use of the herein described inventive process provides ample product quantities suitable for immediate use in many applications without further treatment. In the following examples wherein the invention is set forth in detail, the reactants are utilized in neat preferably liquid, form, being preheated sufficiently to bring them to this desirable state or condition. In accomplishing this the orthochlorobenzaldehyde (OCBA) reactant is usually stored in a ready to use condition at a temperature above 70°F., whereas the malononitrile (MN) reactant is similarly stored at a temperature above 110°F.

The following examples merely illustrate the present invention but are not to be considered as limiting it.

EXAMPLE I

Into a clean, jacketed reaction vessel which was preheated by circulating hot water through the jacket and purged with $CO_2$, approximately 2,100 pounds of liquid orthochlorobenzaldehyde (OCBA) was weighed. Sufficient liquid malononitrile (MN) was added thereafter (approximately 985 pounds) to obtain a substantially stoichiometric mixture of the reactants. A further purge of $CO_2$ was discharged at 30 psi at the surface of the liquid batch or mixture for 3 minutes. A cover was placed over the vessel and sealed with tape and the sealed vessel with its contents moved to a closed mixer equipped with a vacuum pump. The liquid reactants were slowly mixed for at least 5 minutes and the liquid temperature adjusted to be within the range 75° – 80° F. by circulating water of appropriate caloric content through the jacket of the vessel. The vacuum pump was turned on with the vessel open to the atmosphere and air swept across the vessel interior to remove accumulated moisture. Mixing was continued, while from one to two pounds of piperidine catalyst of technical grade was slowly added to the reactants and continued for a period of approximately one minute thereafter. The temperature of the reaction mixture was recorded and the observation made that it was rising, indicating the reaction had begun. Mixing was continued in 3 minute time increments until the mixture or batch temperature reached 125°F. at which time sufficient dry ice in 50 pound pieces were added to the batch to maintain the temperature between 125° – 150° F. Mixing was then continued at slow speed, stopping only to record temperature and verifying it remained within the range above stated (recorded at 5 minute time increments), until a yellow powdery product was formed and no visible water observed. At this point the temperature was recorded and the observation made that it was decreasing from 140° F., indicating the reaction was terminating. Water at 160°F. was circulated through the jacket of the vessel and mixing begun under 15 inches of vacuum permitting sufficient outside air to enter the vessel to maintain the above pressure. Mixing rate was slightly increased until all water was removed from the vessel. Cold water was then circulated through the jacket and mixing continued for a minimum of 15 minutes, or until a white powdered product, analyzed to be 97% orthochlorobenzalmalononitrile, was obtained.

EXAMPLE II

In a laboratory batch solventless experiment using concentrated ammonium hydroxide as catalyst 355 grams of 99.3% purity liquid malononitrile and 761.5 grams of 98.1% pure liquid orthochlorobenzaldehyde were mixed together in a Hobart mixer and agitated. During agitation 1.5 ml of 28–30% ammonium hydroxide was added to the mixture, which resulted in an almost immediate reaction taking place as evidenced by the heat which was evolved. The total $NH_4OH$ catalyst added was 3.0 grams and the resultant product formed, orthochlorobenzalmalononitrile (CS), was somewhat crystalline in appearance and light colored. Continued heating resulted in a lighter appearing product. The heat was continued for approximately 2.0 hours in the Hobart mixer, after which the product was analyzed as follows:

| | |
|---|---|
| Weight per cent purity | 96.5 |
| Weight of volatiles | 0.0 |
| Melting range 92.8°C to 94.1°C | |
| Unreacted MN | 1.0% |
| Unreacted OCBA | approx. 1.0% |

EXAMPLE III

In the reaction vessel preheated and purged as in Example I, the reactants as above stated were added in substantially the same manner, the mixture purged as before and mixing continued as in that Example until the temperature of the batch was within the range of 75° – 80°F. Air was swept across the interior of the vessel to remove accumulated moisture, after which triethynolamine was used for the catalyst rather than piperidine, in approximately the same amount for approximately 3 minutes. A temperature rise again ensued and when it reached 125°F. dry ice was added to maintain it within the range of 125° – 150°F. The reaction was continued in all respects the same as in Example I and resulted in the same product which was analyzed to be 97% orthochlorobenzalmalononitrile.

EXAMPLE IV

Using the reaction apparatus of Examples I and III and substantially the same process steps, approximately 2,260 lbs. of orthochlorobenzaldehyde (OCBA) and approximately 1,080 lbs. of malononitrile (MN) were mixed, and treated as in the Examples I and III above. After slowly mixing the reactants, as described therein approximately 1.0 lb. of concentrated (28–30%) ammonium hydroxide was added to initiate the reaction as before the temperature was observed to rise almost immediately and the process was continued to completion as described in Example I and II until the product, which was analyzed to be 97% orthochlorobenzalmalononitrile (CS), was obtained.

Other materials organic and inorganic which can be catalysts or initiators in effecting the reaction of this inventive process are sodium hydroxide, diethylamine, triethylamine and ammonia, liquid or gas. Water found to be present after completion of the reaction, is removed under a vacuum of up to 15 inches while continuing to circulate hot water through the mixture jacket.

With respect to the catalysts hereinabove described and utilized to initiate and carry out this invention, some, quite obviously, are more efficacious than others. For example, the ammonium hydroxide of Example III, because of its relatively low boiling point, is volatilized by the heat of the reaction and is driven off. Hence the orthochlorobenzalmalononitrile (CS) product obtained is of higher purity since no residual catalyst material remains. Similarly with ammonia, liquid or gaseous, no residuals would be left and a higher purity product can be obtained. Moreover, with ammonia, the reaction temperature itself can be controlled and the process thereby rendered more efficient, it being necessary only to install suitable equipment to bring the ammonia into the mixture to be reacted and disperse it therein.

Having described the process of the invention with respect to its preferred and additional embodiments, various modifications and variations will become apparent to those artisans skilled in the art. It is accordingly understood that such modifications and variations are to be considered as within the purview of this application.

What is claimed is:

1. A solventless process for preparing orthochlorobenzalmalononitrile in powdered form which comprises:

mixing substantially stoichiometric amounts of liquid malononitrile with liquid orthochlorobenzaldehyde in a reaction vessel;

heating said mixed reactants to a temperature in the range of about 75°F. to about 80°F;

adding a catalyst to said mixture at a rate sufficient to initiate an exothermic reaction selected from the group consisting of triethynolamine, piperidine, ammonium-hydroxide, triethylamine, diethylamine, sodium-hydroxide and ammonia, said exothermic reaction initiation being indicated by an increase in temperature of said reacting mixture;

continuing said mixing step until said mixture temperature reaches at least 125°F.;

maintaining said reaction mixture temperature between the range of 125° to 150°F.;

continuing said mixing step until a yellowish powdery product and an indication of decreasing temperature of said reacting products is obtained indicating the reaction is terminating;

heating said mixture, and,;

increasing the rate of mixing of said reactants under a partial vacuum to remove moisture formed and accumulated in said vessel until a white powder, orthochlorobenzalmalononitrile, is obtained.

2. The process of claim 1 wherein the catalyst is ammonium hydroxide.

3. The process of claim 1 wherein the catalyst is piperidine.

4. The process of claim 1 wherein the catalyst is triethynolamine.

5. The process of claim 1 wherein the reaction temperature is maintained by adding dry ice directly to the reacting mixture.

6. The process of claim 1 wherein the catalyst is liquid ammonia and is added in sufficient quantity to maintain the reaction temperature.

* * * * *